Dec. 5, 1961   F. BAYER   3,011,523
VALVE ARRANGEMENT
Filed May 18, 1959   2 Sheets-Sheet 2
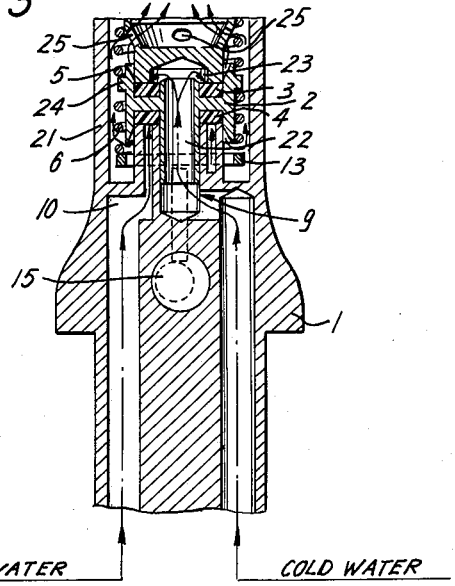
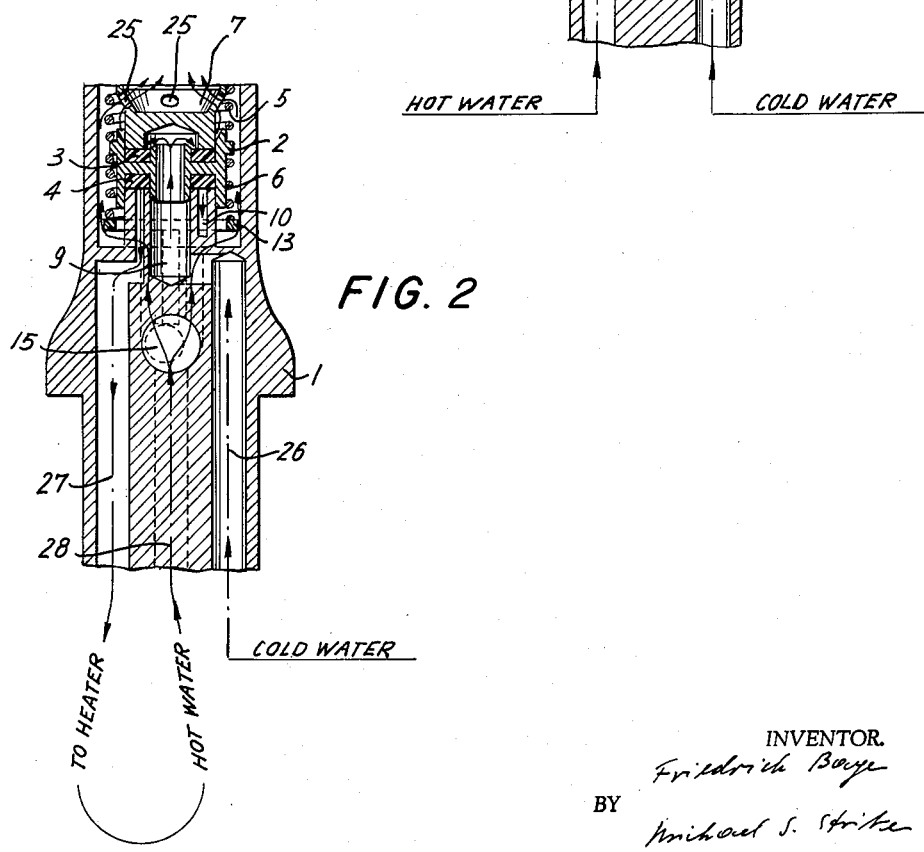
INVENTOR.
Friedrich Bayer
BY
Michael S. Striker
Attorney United States Patent Office 3,011,523
Patented Dec. 5, 1961

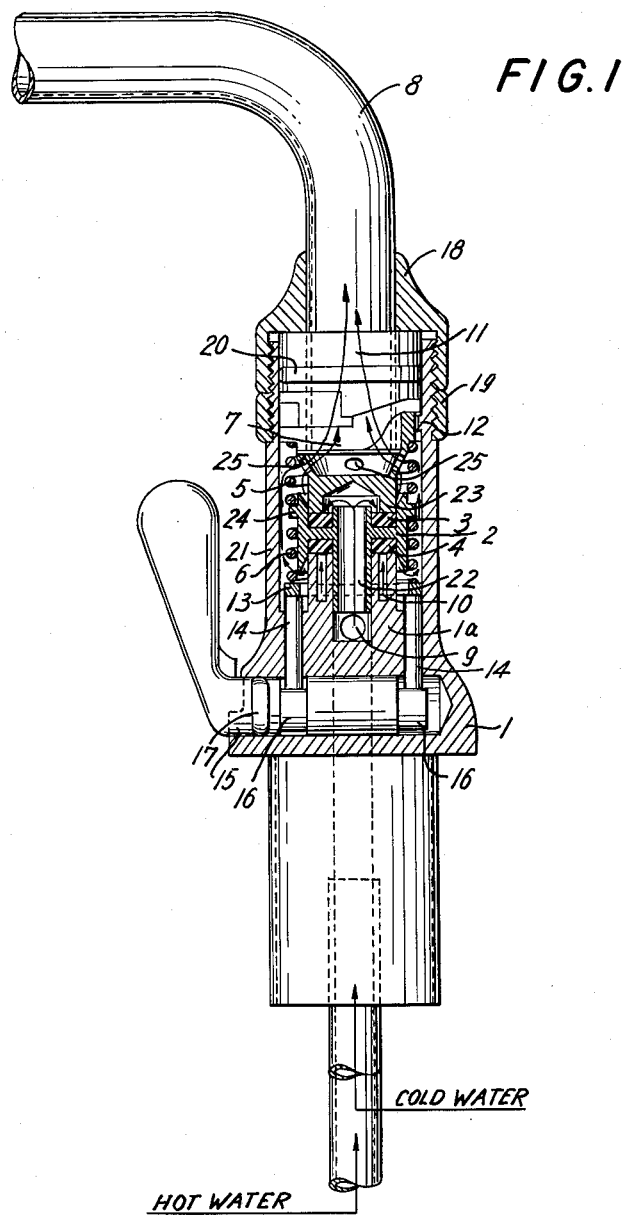

3,011,523
VALVE ARRANGEMENT
Friedrich Bayer, Deilinghofen, Kreis Iserlohn, Germany, assignor to Friedrich Grohe Armaturenfabrik, Hemer, Westphalia, Germany
Filed May 18, 1959, Ser. No. 813,748
Claims priority, application Germany May 17, 1958
11 Claims. (Cl. 137—637)

The present invention relates to valves.

More particularly, the present invention relates to mixing valves capable of mixing, for example, hot and cold water to provide a desired water temperature.

One of the objects of the present invention is to provide a mixing valve of the above type wherein the volume can be controlled independently of the temperature resulting from mixing and where the mixing proportions can be controlled without influencing the total volume of liquid.

A further object of the present invention is to provide a structure capable of accomplishing the above objects and wherein all of the parts are housed within a single tubular housing.

An additional object of the present invention is to provide a structure of the above type which is exceedingly simple, compact and reliable in operation.

With the above objects in view, the present invention includes, in a valve assembly, a pair of valve seats at least one of which is movable toward the other, and a pair of valve members respectively cooperating with the valve seats forming a pair of fluid flow paths therewith. These valve members are connected together and form a single unit located between the valve seats and engaging both of the seats when both of the flow paths are closed. The total volume of fluid derived from both flow paths is controlled by the distance between the valve seats, while the mixing of the fluids of both flow paths is controlled by regulating the position of the above unit between the valve seats.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevational view of one embodiment of a valve assembly according to the present invention;

FIG. 2 is a fragmentary sectional illustration of another embodiment of a valve assembly according to the invention; and FIG. 3 the same in the side sectional view.

Referring now to FIG. 1, the structure illustrated therein includes a tubular housing 1 adapted to be fixed at any suitable location such as at the back of a wash basin. The tubular housing 1 accommodates in its interior all of the structure of the invention required for controlling the volume of flow as well as the mixing of hot and cold water, for example, to provide liquid of a desired temperature. The tubular housing 1 has integrally formed therewith, a stationary valve seat 1a which extends upwardly from the bottom closed end portion of the tubular housing 1. This stationary valve seat 1a is formed with a central inner chamber 9 and with an outer annular chamber 10 concentrically surrounding the chamber 9, both of the chambers 9 and 10 opening onto the top face of the stationary valve seat 1a. A cold water supply conduit communicates through a suitable passage in the bottom end portion of the housing 1 with the inner chamber 9 while a hot water supply conduit communicates also through a suitable passage formed in the lower end portion of the housing 1 with the outer chamber 10.

The valve member 4 cooperates with the stationary valve seat 1a to close the chamber 10 in the position of the parts shown in FIG. 1. This valve member 4 is in the form of an elastic ring, for example, and forms part of a valve unit 2 which is axially movable in the hollow space surrounded by the tubular side wall 21 of the housing 1. The valve unit 2 is annular and has a central tubular portion 22 extending slidably and fluid-tightly into the cylindrical chamber 9 in engagement with the cylindrical surface of the latter, so that the tubular portion 22 of the valve unit 2 maintains the chamber 9 out of communication with the chamber 10.

Also, axially movable within the tubular portion 21 of the housing 1 is a movable valve seat 23 which, in the closed position of the valve illustrated in FIG. 1, engages a second valve member 3 also in the form of a ring, for example. It will be noted that in the closed position shown in FIG. 1, the movable valve seat 23 cooperates with the valve member 3 to close the inner chamber 9 of the stationary valve seat 1a.

Thus, as is apparent from FIG. 1, the valve members 3 and 4 respectively cooperate with the valve seats 1a and 23 to form a pair of flow paths therewith, and when the movable valve seat 23 is in the position illustrated in FIG. 1, so that the unit 2 is clamped between the pair of valve seats, both of the flow paths are closed.

A spring means is provided for urging the movable valve seat 23 away from the stationary valve seat 1a to an open position, and this spring means also cooperates with the unit 2 for positioning the latter between and spaced from the valve seats for opening both of the flow paths. This spring means includes a peripheral flange 24 integral with the unit 2 and extending around the exterior thereof, this flange 24 engaging at its top face the bottom end of a coil spring 5 and at its bottom face the top end of a coil spring 6. The top end of the spring 5 engages a cam portion 7 which is fixed to or formed integrally with the movable valve seat 23 while the bottom end of the coil spring 6 engages a support formed by the ring 13 which freely surrounds the stationary valve seat and is freely movable therealong within the hollow tubular portion 21 of the housing 1.

The movable valve seat 23 has an intermediate outwardly flaring annular portion just beneath the cam portion 7 formed with a plurality of openings 25 and this flaring portion of the movable valve seat is fixed to an annular cam member 7 having an upper camming edge which cooperates with a lower peripheral camming edge 11 of a swivel spout 8. Thus, the upper annular edge of the circular member 7 extends along part of a spiral, for example, and the lower annular edge of the swivel spout 8 also extends along a similar spiral so that the camming portions 7 and 11 cooperate to control the axial position of the movable valve seat 23. The swivel spout 8 is retained by a suitable cap nut 18 in the top end of the tubular portion 21 of the housing 1, and, as is shown in FIG. 1, a sealing ring 20 surrounds the lower portion of the swivel spout 8 which is located within the tubular housing portion 21. A lock nut 19 cooperates with the cap nut 18 to fix the axial position of the latter.

With the above-described arrangement, when the swivel spout 8 extends across the back of the wash basin, the cam portion 11 is in the illustrated position cooperating with the cam portion 7 to hold the valve seat 23 in its lowest position clamping the unit 2 between the valve seats for closing the supply of both the hot and the cold water. To open the valve, the operator turns the swivel spout 8 toward the front of the wash basin. Only the rear portion of the swivel spout 8 is shown in FIG. 1. This swivel spout is of substantially U-shaped configuration. Thus, as the user turns the discharge end of the spout toward the front of the wash basin, the rear end of the swivel spout 8 will turn to cause the cam portion 11 to turn with respect to the cam portion 7 so that the spring means 5, 6 can expand and raise the movable valve seat 23 away from the stationary valve seat 1a. A lateral portion of the movable valve seat 23 is formed with an axial groove into which a rib 12 in the interior of the tubular housing portion 21 extends so as to prevent turning of the movable valve seat 23 and cam 7 therewith, while freeing these parts for vertical movement. Thus, when the valve is opened by the operator, in this way, the spring means 5, 6 will raise the movable valve seat to an elevation determined by the extent to which the swivel spout is turned. In the illustrated position of the parts, the spring means 5 and 6 are balanced against each other in such a way that the valve members 3 and 4 will automatically become located at substantially equal distances from the valve seats, so that flow paths of equal cross section will be provided for the hot and cold water respectively issuing from the outer chamber 10 and the inner chamber 9. For example, if the swivel spout 8 has been turned through an angle sufficient to permit the spring means to move the movable valve seat away from the stationary valve seat by a distance of 4 mm., for example, then the valve member 4 will automatically be located at a distance of 2 mm. from the stationary valve seat 1a while the valve member 3 will automatically be located at a distance of 2 mm. from the movable valve seat 23. In this open position of the valve, the liquid from the outer chamber 10 will flow around the stationary valve seat and around the bottom annular end of the unit 2 upwardly along the latter in the space between the unit 2 and the tubular wall 21 and through the openings 25 to the swivel spout 8. The liquid in the inner chamber 9 will flow upwardly through the tube 22 and then through the space between the valve seat 23 and the valve member 3 upwardly along the exterior of the movable valve seat 23 through the openings 25 of the latter into the swivel spout which thus forms a common outlet for both flow paths.

The structure of the invention also includes a means for regulating the mixing of the hot and cold water without changing the total volume determined by the angular position of the swivel spout 8. This mixing control includes a manually operable adjusting means formed by the shaft 15 which is fluid-tightly turnable in a transverse horizontal bore extending into the lower portion of the housing 1 as shown in FIG. 1. The shaft 15 is formed with a pair of portions 16 of reduced diameter whose centers are displaced from the axis of the shaft 15 so that the portions 16 form eccentrics, and the shaft 15 has a suitable handle at the exterior of the housing 1 so that the operator can turn the shaft 15. The tubular housing 1 is also formed with a pair of vertical parallel bores through which rods 14 slidably extend in a fluid-tight manner, and these rods 14 have their bottom ends in engagement with the eccentric portions 16 of the shaft 15. Thus, the angular position of the shaft 15 will determine the elevation of the rods 14 whose top ends bear against the underside of the ring 13. It will be noted that because the eccentric portions 16 are of reduced diameter, the rods 14 serve the additional function of preventing axial movement of the shaft 15 out of the housing 1.

Thus, by manual turning of the shaft 15, the rods 14 and the ring 13 therewith, will be moved vertically to act on the springs 5 and 6 so as to regulate the position of the valve unit 2 between the valve seats without influencing the valve seats themselves. For example, in the above-mentioned case where the movable valve seat has been raised through 4 mm., it is possible to adjust the shaft 15 so that the valve member 4 is spaced from the stationary valve seat 1a by a distance of 3 mm. while the valve member 3 is spaced from the movable valve seat 23 by a distance of 1 mm. and thus, the proportions of hot water to cold water can be increased without changing the total volume.

Of course, this operation presupposes a condition where the pressures of the liquids in the two flow paths are substantially identical. Thus, it is possible with the single assembly of the invention to control both the volume and the temperature independently of each other. Naturally, the invention is not limited to a swivel spout which also controls the volume, and any conventional faucet spindle may have a bottom camming end cooperating with the cam 7, if desired.

The invention also is not limited to an arrangement where separate supplies of separate liquids respectively communicate with the chambers 9 and 10. For example, the structure of FIG. 1 may be changed slightly to that illustrated in FIG. 2 in order to accommodate the valve assembly of the invention for use with a different type of installation. The structure of the invention is shown in FIG. 2 in a plane displaced through 90° with respect to FIG. 1 so as to illustrate more clearly the supply conduits leading to the chambers of the stationary valve seat.

As may be seen from FIG. 2, the chamber 9 is supplied with liquid from the conduit 26. In the embodiment of FIG. 2, the valve unit 2 no longer includes the central tubular portion 22. However, the outer wall of the unit 2 fluid-tightly and slidably engages the exterior surface of the stationary valve seat. Thus, with this arrangement, when the valve is open, the liquid from the inner chamber 9, in addition to flowing through the space between the movable valve seat and the valve member 3 to the common outlet, will also be able to flow from the chamber 9 to the chamber 10. From the chamber 10, the liquid flows in this embodiment along a conduit 27 to a suitable heater, for example, and from the heater, the liquid now returns along a conduit 28 to the space within the tubular portion of the housing 1 which surrounds the valve unit 2. Thus, the conduit 28 communicates directly with the space between the valve unit 2 and the tubular wall of the housing 1. Thus, with this simple variation of the structure of FIG. 1, it is possible to adapt the valve of the invention to an arrangement where a single cold water supply 26 provides, not only the cold water, but in addition, the water which is heated before reaching the outlet.

Except for the above noted variations, the structure of FIG. 2 is identical with that of FIG. 1.

It will be understood that each of the elements described above, or two or more together, may also find a useful application in other types of valves differing from the types described above.

While the invention has been illustrated and described as embodied in mixing valves, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a valve assembly, in combination, a pair of valve seats and a pair of valve members respectively cooperating with said seats to form a pair of flow paths therewith, said valve members forming a single unit located between said seats; guide means cooperating with at least one of said seats to guide the latter for movement toward and away from the other of said seats; spring means cooperating with said valve seats for urging said one valve seat away from said other valve seat to an open position, said spring means also urging said unit to a position between and spaced from said seats when said one valve seat is in its open position; and manually operable control means cooperating with said one valve seat for moving the latter in opposition to said spring means toward said other valve seat to a closed position where said unit is clamped between said seats.

2. In a valve assembly, in combination, a pair of valve seats and a pair of valve members respectively cooperating with said seats to form a pair of flow paths therewith, said valve members forming a single unit located between said seats; guide means cooperating with at least one of said seats to guide the latter for movement toward and away from the other of said seats; spring means cooperating with said valve seats for urging said one valve seat away from said other valve seat to an open position, said spring means also urging said unit to a position between and spaced from said seats when said one valve seat is in its open position; manually operable control means cooperating with said one valve seat for moving the latter in opposition to said spring means toward said other valve seat to a closed position where said unit is clamped between said seats; and manually operable adjusting means cooperating with said spring means for adjusting the position of said unit between said seats when said one valve seat is in its open position so that without changing the total cross section of both flow paths, one of said paths may be increased while the other is correspondingly decreased.

3. In a valve assembly, in combination, a pair of valve seats and a pair of valve members respectively cooperating with said seats to form a pair of flow paths therewith, said valve members forming a single unit located between said seats; guide means cooperating with at least one of said seats to guide the latter for movement toward and away from the other of said seats; spring means cooperating with said valve seats for urging said one valve seat away from said other valve seat to an open position, said spring means also urging said unit to a position between and spaced from said seats when said one valve seat is in its open position; manually operable control means cooperating with said one valve seat for moving the latter in opposition to said spring means toward said other valve seat to a closed position where said unit is clamped between said seats; manually operable adjusting means cooperating with said spring means for adjusting the position of said unit between said seats when said one valve seat is in its open position so that without changing the total cross section of both flow paths, one of said paths may be increased while the other is correspondingly decreased; and a common outlet communicating with both of said flow paths so that when hot and cold water respectively flow through said paths, said adjusting means may be set to mix the hot and cold water in desired proportion to provide at the outlet water of a desired temperature.

4. In a valve assembly, in combination, a stationary valve seat; a movable valve seat; guide means cooperating with said movable valve seat for guiding the same for movement toward and away from said stationary valve seat; a pair of valve members respectively cooperating with said seats to form a pair of flow paths therewith, said valve members forming a single unit located between said seats; spring means cooperating with said movable valve seat for urging the latter away from said stationary valve seat and also cooperating with said unit for urging the latter to a position intermediate and spaced from said seats when said movable valve seat is located in an open position spaced from said stationary valve seat by a distance greater than that occupied by said unit; and manually operable cam means cooperating with said movable valve seat for moving the latter in opposition to said spring means to a closed position clamping said unit between said seats.

5. In a valve assembly, in combination, a stationary valve seat; a movable valve seat; guide means cooperating with said movable valve seat for guiding the same for movement toward and away from said stationary valve seat; a pair of valve members respectively cooperating with said seats to form a pair of flow paths therewith, said valve members forming a single unit located between said seats; spring means cooperating with said movable valve seat for urging the latter away from said stationary valve seat and also cooperating with said unit for urging the latter to a position intermediate and spaced from said seats when said movable valve seat is located in an open position spaced from said stationary valve seat by a distance greater than that occupied by said unit; manually operable cam means cooperating with said movable valve seat for moving the latter in opposition to said spring means to a closed position clamping said unit between said seats; and an outlet tube common to both of said flow paths for receiving fluid therefrom, said tube being turnably connected to said guide means and carrying said cam means so that turning of said tube by the operator actuates said cam means to effect the opening and closing of said flow paths.

6. In a valve assembly, in combination, a stationary valve seat; a movable valve seat; guide means cooperating with said movable valve seat for guiding the same for movement toward and away from said stationary valve seat; a pair of valve members respectively cooperating with said seats to form a pair of flow paths therewith, said valve members forming a single unit located between said seats; spring means cooperating with said movable valve seat for urging the latter away from said stationary valve seat and also cooperating with said unit for urging the latter to a position intermediate and spaced from said seats when said movable valve seat is located in an open position spaced from said stationary valve seat by a distance greater than that occupied by said unit; manually operable cam means cooperating with said movable valve seat for moving the latter in opposition to said spring means to a closed position clamping said unit between said seats; an outlet tube common to both of said flow paths for receiving fluid therefrom, said tube being turnably connected to said guide means and carrying said cam means so that turning of said tube by the operator actuates said cam means to effect the opening and closing of said flow paths; and manually operable adjusting means cooperating with said spring means for regulating the position of said unit between said valve seats when said flow paths are open.

7. In a valve assembly, in combination, a stationary valve seat and a movable valve seat movable toward and away from said stationary valve seat; a pair of valve members located between said seats and forming a single unit, said unit having a peripheral flange located between its ends; a pair of springs respectively engaging opposed faces of said flange, one of said springs engaging said movable valve seat to urge the latter away from said flange; a support engaged by the other of said springs, so that said springs urge said movable valve seat away from said stationary valve seat and said unit to a position intermediate and spaced from said seats; and manually operable means for moving said movable seat in opposition to said springs toward said stationary seat to a closed position where said unit is clamped between said seats.

8. In a valve assembly, in combination, a stationary valve seat and a movable valve seat movable toward and away from said stationary valve seat; a pair of valve members located between said seats and forming a single unit, said unit having a peripheral flange located between its ends; a pair of springs respectively engaging opposed faces of said flange, one of said springs engaging said movable valve seat to urge the latter away from said flange; a support engaged by the other of said springs, so that said springs urge said movable valve seat away from said stationary valve seat and said unit to a position intermediate and spaced from said seats; manually operable means for moving said movable seat in opposition to said springs toward said stationary seat to a closed position where said unit is clamped between said seats; and manually operable adjusting means cooperating with said support for adjusting the position thereof along said stationary valve seat so as to control the position of said unit between said seats when said movable seat is spaced from said stationary seat by a distance greater than that occupied by said unit.

9. In a valve assembly as recited in claim 8, said support being in the form of a ring surrounding and freely movable along said stationary valve seat and said adjusting means including an eccentric shaft and at least one pin engaging said shaft and ring for determining the position of said ring.

10. In a valve assembly, in combination, a stationary valve seat formed with an inner chamber and an outer chamber concentrically surrounding said inner chamber, both of said chambers opening onto an end face of said stationary valve seat; an annular valve unit including a central tubular portion communicating with said inner chamber and a first valve member engaging said end face of said stationary valve seat and closing said outer chamber when said valve unit is in a closed position; a movable valve seat located at the side of said unit opposite from said stationary valve seat, said unit including a second valve member engaging said movable valve seat to close said inner chamber; spring means urging said movable valve seat away from said stationary valve seat to an open position and also urging said unit to a position where said first and second valve members are respectively spaced from said seats to open both of said chambers; and manually operable means cooperating with said movable valve seat for moving the latter in opposition to said spring means toward said stationary valve seat to a closed position where said unit is clamped between said seats with said first and second valve members respectively engaging said stationary and movable valve seats for closing both chambers.

11. In a valve assembly, in combination, a pair of valve seats and a pair of valve members respectively cooperating with said seats to form a pair of flow paths therewith, said valve members forming a single unit located between said valve seats and at least one of said valve seats being movable with respect to the other; means operatively connected to said one movable valve seat for moving the same toward the other valve seat to a closed position where said unit is clamped between said valve seats and for moving said one valve seat away from the other valve seat to an open position where said seats form a space between themselves in which said unit may move to a position between and spaced from both of said seats for opening both of said flow paths; and means operatively connected to said unit for adjusting the position thereof between said seats when said one valve seat is in its open position so that without changing the total cross section of both flow paths, one of said paths may be increased while the other is correspondingly decreased.

References Cited in the file of this patent

UNITED STATES PATENTS

| | | |
|---|---|---|
| 1,833,939 | Gibbs | Dec. 1, 1931 |
| 1,834,449 | Farmer | Dec. 1, 1931 |
| 2,668,035 | Trevaskis | Feb. 2, 1954 |

FOREIGN PATENTS

| | | |
|---|---|---|
| 11,165 | Denmark | of 1908 |